(12) United States Patent
Argoitia et al.

(10) Patent No.: US 6,902,807 B1
(45) Date of Patent: Jun. 7, 2005

(54) ALIGNABLE DIFFRACTIVE PIGMENT FLAKES

(75) Inventors: Alberto Argoitia, Santa Rosa, CA (US); Vladimir P. Raksha, Santa Rosa, CA (US); Dishuan Chu, Rohnert Park, CA (US)

(73) Assignee: Flex Products, Inc., Santa Rosa, CA (US)

( * ) Notice: Subject to any disclaimer, the term of this patent is extended or adjusted under 35 U.S.C. 154(b) by 102 days.

(21) Appl. No.: 10/243,111

(22) Filed: Sep. 13, 2002

(51) Int. Cl.⁷ ............................. B32B 5/16; C09D 17/00
(52) U.S. Cl. .................... 428/403; 428/32.16; 428/323; 428/328; 106/31.13; 106/31.6; 106/31.65; 106/31.9
(58) Field of Search .................... 428/403, 323, 428/328, 32.36, 402; 406/31.13, 31.6, 31.65, 31.9

(56) References Cited

U.S. PATENT DOCUMENTS

| | | | |
|---|---|---|---|
| 3,610,721 A | 10/1971 | Abramson et al. ........... 350/3.5 |
| 3,676,273 A | 7/1972 | Graves ............................ 161/3 |
| 3,790,407 A * | 2/1974 | Merten et al. ............... 428/148 |
| 3,791,864 A | 2/1974 | Steingroever ................ 117/238 |
| 3,853,676 A | 12/1974 | Graves ............................ 161/5 |
| 4,011,009 A * | 3/1977 | Lama et al. ................. 359/571 |
| 4,398,798 A * | 8/1983 | Krawczak et al. .......... 359/573 |
| 5,079,085 A | 1/1992 | Hashimoto et al. ......... 428/327 |
| 5,192,611 A | 3/1993 | Tomiyama et al. .......... 428/354 |
| 5,364,689 A | 11/1994 | Kashiwagi et al. .......... 428/195 |
| 5,368,898 A * | 11/1994 | Akedo ........................... 427/510 |
| 5,424,119 A | 6/1995 | Phillips et al. .............. 428/328 |
| 5,613,022 A * | 3/1997 | Odhner et al. ................ 385/37 |
| 5,624,076 A | 4/1997 | Miekka et al. ................ 241/3 |
| 5,627,663 A * | 5/1997 | Horan et al. .................... 359/2 |
| 5,630,877 A | 5/1997 | Kashiwagi et al. ......... 118/623 |
| 5,672,410 A * | 9/1997 | Miekka et al. ............... 428/148 |
| 5,991,078 A * | 11/1999 | Yoshitake et al. ........... 359/567 |
| 6,033,782 A | 3/2000 | Hubbard et al. ............. 428/407 |
| 6,043,936 A * | 3/2000 | Large ............................ 359/572 |
| 6,103,361 A | 8/2000 | Batzar et al. ................ 428/323 |
| 6,168,100 B1 * | 1/2001 | Kato et al. ....................... 241/1 |
| 6,692,830 B2 * | 2/2004 | Argoitia et al. .............. 428/403 |

FOREIGN PATENT DOCUMENTS

| | | | |
|---|---|---|---|
| EP | 0341002 B2 | 11/1989 | .......... G06K/19/08 |
| EP | 0556449 B1 | 8/1993 | ............ B05D/3/14 |
| EP | 406667 B1 | 1/1995 | |
| EP | 710508 A1 | 5/1996 | |
| EP | 0953937 A1 | 11/1999 | .......... G06K/19/08 |
| EP | 1239307 | 9/2002 | ............ G02B/5/22 |
| JP | 63172279 | 7/1988 | ............ C09D/5/29 |
| WO | WO 02/40600 | 5/2002 | ............ C09C/1/00 |

OTHER PUBLICATIONS

Llewellyn, "Dovids: Functional Beauty—discussion about holography", Paper, Film, and Foil Converter, Aug. 2002.*
Hardin, "Optical tricks designed to foil counterfeiters", OE Reports, No. 191, Nov. 1999.*

(Continued)

*Primary Examiner*—H. Thi Le
(74) *Attorney, Agent, or Firm*—Allen, Dyer, Doffelt, Milbrath & Gilchrist, P.A.

(57) ABSTRACT

Diffractive pigment flakes are selectively aligned to form an image. In one embodiment, flakes having a magnetic layer are shaped to facilitate alignment in a magnetic field. In another embodiment, the flakes include a magnetically discontinuous layer. In a particular embodiment, deposition of nickel on a diffraction grating pattern produces magnetic needles along the grating pattern that allow magnetic alignment of the resulting diffractive pigment flakes. Color scans of test samples of magnetically aligned flakes show high differentiation between illumination parallel and perpendicular to the direction of alignment of the magnetic diffractive pigment flakes.

35 Claims, 9 Drawing Sheets

OTHER PUBLICATIONS

U.S. Appl. No. 10/117,307, filed Apr. 05, 2002, Argoitia et al.

U.S. Appl. No. 10/029,405, filed Dec. 20, 2001, Argoitia et al.

U.S. Appl. No. 09/919,346, filed Jul. 31, 2001, Argoitia et al.

U.S. Appl. No. 09/850,421, filed May 07, 2001, Phillips et al.

Argoitia and Witzman, *Pigments Exhibiting Diffractive Effects,* Soc. of Vac. Coaters, 45$^{th}$ Annual Tech. Conf. Proceed. (2002).

Powell et al. (ED.), *Vapor Deposition,* John Wiley & Sons, p. 132 (1996).

Van Renesse (Ed.), *Optical Document Security,* 2$^{nd}$ Ed., Artech House 254, 349–69 (1997).

Dobrowolski et al., *Research on Thin Film Anticounterfeiting Coatings at the National Research Council of Canada,* Applied Optics, vol. 28, No. 14, pp. 2702–17 (Jul. 15, 1989).

Lotz et al., *Optical Layers on Large Area Plastic Films,* Precision, Applied Films (Nov. 2001).

Himpsel et al., *Nanowires by Step Decoration,* Mat. Research Soc. Bul., pp. 20–24 (Aug. 1999).

Prokes and Wang (ED.), *Novel Methods of Nanoscale Wire Formation,* Mat. Research Soc. Bul., pp. 13–14 (Aug. 1999).

\* cited by examiner

ALIGNABLE DIFFRACTIVE PIGMENT FLAKES

CROSS-REFERENCE TO RELATED APPLICATIONS

This patent application claims priority from commonly owned U.S. patent application Ser. No. 10/029,405 entitled ACHROMATIC MULTILAYER DIFFRACTIVE PIGMENTS AND FOILS, filed Dec. 20, 2001 by Alberto Argoitia, Paul G. Coombs, Charles T. Markantes, and Richard A. Bradley, Jr.; from commonly owned U.S. patent application Ser. No. 09/919,346, entitled DIFFRACTIVE PIGMENT FLAKES AND COMPOSITIONS, filed Jul. 31, 2001 by Albert Argoitia and Richard A. Bradley, Jr.; and from commonly owned U.S. patent application Ser. No. 10/117,307 entitled CHROMATIC DIFFRACTIVE PIGMENTS AND FOILS, filed Apr. 5, 2002 by Alberto Argoitia, Roger Phillips, Michael Nofi, Paul G. Coombs, Charles T. Markantes, and Richard A. Bradley, Jr., the disclosures of which are hereby incorporated in their entirety for all purposes.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

The present invention relates generally to pigments with an optically diffractive structure and diffractive optically variable image devices ("DOVID"), such as orientable diffractive pigment flakes and stereograms, linegrams, graphic element-oriented devices, dot-oriented devices, and pixle-oriented devices, and oriented optically variable pigment flakes.

Optically variable pigments ("OVP's"™) are used in a wide variety of applications. They can be used in paint or ink, or mixed with plastic. Such paint or ink is used for decorative purposes or as an anti-counterfeiting measure on currency. One type of OVP uses a number of thin-film layers on a substrate that form an optical interference structure. Generally, a dielectric (spacer) layer is often formed on a reflector, and then a layer of optically absorbing material is formed on the spacer layer. Additional layers may be added for additional effects, such as adding additional spacer-absorber layer pairs. Alternatively optical stacks composed of (high-low-high)$^n$ or (low-high-low)$^n$ dielectric materials, or combinations of both, may be prepared.

Another type of pigment uses a pattern, such as a series of grooves, to create a diffractive interference structure. Diffractive pigments have been used to create an iridescent effect, both on printed media and in paints, such as automotive paint.

There are other products that use diffractive interference to achieve a desired effect, which are generally known as diffractive, optically-variable image devices ("DOVIDs"). Some DOVIDs provide various images depending on the angle at which they are viewed. For example, some types of DOVIDs can make one printed object appear in front of another, provide a succession of images based on viewing angle, or give the appearance of motion in a two-dimensional image as the angle of view is changed. Other DOVIDs might have an image that appears at one viewing angle, and disappears at another. DOVIDs have been used for anti-counterfeiting purposes on bank notes, credit cards, software media, and other high-value documents, as well as for decorative purposes. A particular type of DOVID is known as a "pixel-gram". A pixel-gram is based on a non-uniform spatial distribution of different linear diffraction areas (pixels). When rotated or tilted, different images can appear or disappear, making the pixel-grams difficult to counterfeit because even a high-quality color photocopier will not copy the variable effects of the image.

The techniques used to achieve holographic microstructures on a master hologram, such as interferometry, holography, chemical etching, ion beam lithography, and electron beam lithography are relatively complex and expensive. After a master hologram is prepared, a replication tool from the master is typically generated. The replication tool presses the surface relief microstructure in a polymeric foil, which is then aluminized on the back of the foil. The foil is then stamped on the document. A master hologram must be made for each new image, or if the master hologram wears out Thus, it would be desirable to provide simpler articles and techniques for producing DOVIDs. It is further desirable to be able to align pigment flakes in a desired orientation to achieve various optical effects.

BRIEF SUMMARY OF THE INVENTION

Pigment particles with diffraction gratings are selectively aligned to form an image or images. Different fields can be printed with different diffractive pigment, or with diffractive pigment that has been aligned in selected directions. Similarly, images can be created with pixels or dots of different and/or differently aligned diffractive pigments. One embodiment of the present invention is a printed pixelgram, another is a dot DOVID, and another is a kinegram.

In another embodiment of the present invention, pigment flakes with a layer of magnetic material may be shaped to facilitate alignment of the pigment flakes in a magnetic field, before, during, or after application to a medium. In another embodiment, randomly shaped flakes include a shaped magnetic structure that facilitates alignment of the flake in a magnetic field. In a particular embodiment, a layer of magnetic material is deposited to a selected thickness on a patterned underlayer (e.g. diffraction grating pattern) to form a discontinuous magnetic layer, such as magnetic needles. In another embodiment, diffractive flakes are mechanically aligned, such as by drawing a blade over grooved or shaped particles, or by a roller.

DETAILED DESCRIPTION OF THE INVENTION

I. Introduction

In one embodiment, the present invention provides magnetically orientable diffractive pigment flakes. In a particular embodiment, magnetically orientable diffractive pigment flakes are used to print images, including DOVIDs. Diffractive pigment flakes are generally small particles used in paints, inks, films, plastics that provide variable perceived color, lightness, hue, and/or chroma, depending on the angle of view. Some diffractive pigments, such as ones including Fabry-Perot-type interference structures, shift the observed color, as well as providing diffractive effects. Thin-film interference structures using dielectric layers can also be combined with a microstructure diffraction pattern. Some embodiments include a diffractive reflector layer in combination with a spacer layer and an absorber layer to form a flake having both diffraction and thin-film interference.

Pigments with diffraction gratings separate light into spectral components, similar to a prism, so that the perceived color changes with viewing angle. It has been found that pigment flakes can be oriented with magnetic fields if the pigment flake includes a magnetic material. For the purposes of this application, "magnetic" materials can be ferro- or ferri-magnetic. Nickel, cobalt, iron, gadolinium, terbium, dysprosium, erbium, and their alloys and oxides, Fe/Si, Fe/Ni, Fe/Co, Fe/Ni/Mo, $SmCo_5$, $NdCo_5$, $Sm_2Co_{17}$, $Nd_2Fe_{14}B$, $TbFe_2$, $Fe_3O_4$, $NiFe_2O_4$, and $CoFe_2O_4$, are magnetic materials. It is not necessary that the magnetic layer, or the magnetic material of the magnetic layer, be capable of being permanently magnetized, although it could be. In some embodiments, magnetic material capable of being permanently magnetized is included in a flake, but remains unmagnetized until after it is applied to form an image. In a further embodiment, flakes with permanent magnet material are applied to a substrate to form a visual image, and subsequently magnetized to form a magnetic image, in addition to the visual image. Some magnetic flakes tend to clump together if the remnant magnetization is too high prior to forming the image or mixing with a paint or ink vehicle.

II. Exemplary Flake Structures

Figure 1A:
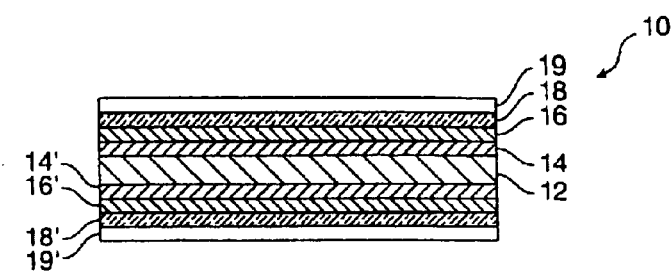
FIGS. 1A–1D are simplified cross sections of exemplary flake structures according to various embodiments of the present invention.

FIG. 1A is a simplified cross section of a coated flake 10 according to an embodiment of the present invention. A series of thin film layers has been deposited on a substrate 12. The thin film layers include a layer of magnetic material 14, 14', a layer of reflective material 16, 16', and additional layers 18, 18'. The additional layers could be spacer layers of dielectric material 18, 18' having a thickness selected to provide a particular interference wavelength and an absorber layer 19, 19', for example. Although the coated flake is shown as having a symmetrical coating on both sides of the substrate 12, the coatings could be unsymmetrical, even completely absent, on one side. Similarly, a flake could be encapsulated by successive coating layers. Many optical designs are known to achieve a variety of color-shifting, selective absorption/reflection, and other optical effects. In an alternative embodiment, the substrate 12 is a magnetic material and the separate layer of magnetic material 14 is omitted. In yet another embodiment, the substrate is both reflective and magnetic, and the reflective layer 16 is also omitted. In yet another embodiment, the reflective layer is a magnetic material, and a separate layer of magnetic material is omitted. In another embodiment, the absorber layer(s) can be a magnetic layer.

Suitable substrates may be formed from materials such as glass, mica, alumina, iron oxide, graphite, bismuth oxychloride, boron nitride, polymer or metal or similar particle. Examples of suitable reflector material include aluminum, silver, iron, tantalum, iridium, rhenium, copper, silver, gold, platinum, palladium, nickel, cobalt, niobium, chromium, tin, and combinations or alloys. Suitable materials for the spacer layer includes zinc sulfide (ZnS), zinc oxide (ZnO), zirconium oxide ($ZrO_2$), titanium dioxide ($TiO_2$), diamond-like carbon, indium oxide ($In_2O_3$), indium-tin-oxide ("ITO"), tantalum pentoxide (Ta2O5), ceric oxide ($CeO_2$), yttrium oxide ($Y_2O_3$), europium oxide ($Eu_2O_3$), iron oxides such as (II)diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon (Si), silicon monoxide (SiO), germanium (Ge), selenium trioxide ($Se_2O_3$), tin oxide ($SnO_2$), tungsten trioxide ($WO_3$), silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SMF_3$), barium fluoride ($BaF_2$), calcium fluoride ($CaF_2$), lithium fluoride (LiF), and combinations thereof, and organic monomers and polymers including dienes or alkenes such as acrylates (e.g., methacrylate), perfluoroalkenes, polytetrafluoroethylene (e.g., TEFLON®), fluorinated ethylene propylene ("FEP"), combinations thereof, and the like. Examples of suitable absorber materials include chromium, nickel, iron, titanium, aluminum, tungsten, molybdenum, niobium, combinations, compounds or alloys thereof, such as INCONEL™ (Ni—Cr—Fe), metals mixed in a dielectric matrix, or other substances that are capable of acting as a uniform or selective absorber in the visible spectrum. Alternatively, the absorber can also be a dielectric material such as an iron oxide (e.g., $Fe_2O_3$), silicon monoxide (SiO), chromium oxide ($Cr_2O_3$), carbon, titanium sub-oxide ($TiO_x$) where x is less than 2.0), metal carbides, metal carbo-nitrides, combinations thereof, and the like. Metal absorber layers are generally deposited in a layer that is sufficiently thin so as to allow substantial transmission of light through the absorber layer.

In a particular embodiment, the substrate is a glass flake, the magnetic material is Ni—Co, and the reflective layer is aluminum. The additional layers 18 include a dielectric material, such as $SiO_2$ or $TiO_2$, and the absorber material is a semi-transparent layer of metal or intennetallic such as titanium nitride (TiN). These materials are merely exemplary of possible embodiments, and many other suitable materials and combinations are known.

The reflector layer 16 and subsequent thin film layers 18 form a Fabry-Perot interference filter, which can provide a strong color shift, also called "color travel", as the viewing angle of the flake changes. If dispersed in a binder, such as clear paint, plastic, or other medium, the aggregate effect is that the color of the object varies with viewing angle, which can arise because of relative motion between the object and viewer, or because the object includes a curved surface. Other embodiments may omit the reflector layer, or may not have a Fabry-Perot interference structure, some having a silvery color.

Figure 1B:
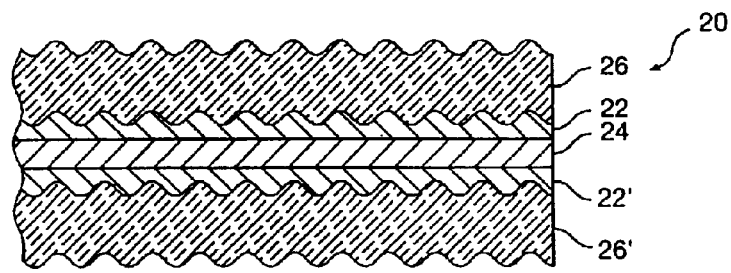

FIG. 1B is a simplified cross section of a diffractive flake 20 according to another embodiment of the present invention. Reflector layers 22, 22' have been patterned, e.g. embossed, with a periodic structure that is shown in cross-section as a sinusoidal variation in the surface of the substrate, and includes a magnetic layer 24. In an alternate embodiment, the reflector layer is an embossed reflective magnetic material and the separate magnetic layer 24 is omitted. The magnetic layer is shown as not being embossed, but could be embossed in other embodiments. In another embodiment, the magnetic layer is discontinuous and formed along the structure of the diffraction grating. In another embodiment, an embossed layer is provided on only one side of the flake.

In a particular embodiment, a substrate, such as a polyethylene terephthalate ("PET") flake or film, is coated with an embossing layer, which is embossed to create the diffraction grating pattern. The embossing layer might be a layer of polymer that is cross-linked before or after embossing the pattern, such as by rolling the substrate between rollers, at least one of which is patterned. In one embodiment, an embossed roll of film is coated with a magnetic layer, either continuous or discontinuous, and then a reflective layer, such as a layer of aluminum. In an alternate embodiment, the magnetic layer is a reflective material, obviating the need for a separate reflector layer. The coated, embossed film is then processed into flakes, such as by laser-cutting. In some embodiments, the magnetic layer may be omitted. Such flakes may be used to form DOVIDs with appropriate techniques of application of the flake to a substrate to align the diffraction grating in a desired direction.

The embossed pattern is commonly known as a "diffraction grating". The line density is typically between about 500 lines/mm to about 5000 lines/mm, and are typically about 20 nm to about 300 nm deep. A line density of about 1400–2000 lines/mm with an aluminum reflector has been found to provide good color characteristics in paint drawdown samples. The lines (grooves) can be straight lines, triangular symmetrical gratings, triangular blazed gratings, square-wave gratings, or cross-hatched gratings, to name a few. The flakes are generally about 20–50 microns across, although the flakes may be significantly smaller or larger, and the total thickness of the flakes can be very thin. In some embodiments, the total thickness of a flake is between about 500 nm to about 2 microns, but can be thinner or thicker. In particular, flakes having a stiffening layer(s) might be thicker. Stiffening layers are typically layers of dielectric material that are added to flake structures to improve handling characteristics.

The diffraction grating pattern is shown as being replicated in the outer surfaces of the clear layers 26, 26', but this is not necessary in other embodiments. The clear layers could be an inorganic material, such as $SiO_2$, or a polymer. In some embodiments, the clear layers add stiffness to the coating structures to assist in processing, such as grinding and sorting to size, and application of the pigment flakes to an object. The clear layers can also protect the reflective layer from environmental factors that could otherwise degrade the reflectivity. In other embodiments, the clear layer(s) is omitted. In some applications, pigment flakes with diffraction grating patterns are applied in a carrier that provides some degree of environmental protection. In further embodiments, the material of the clear layers is chosen to have a refractive index similar to the refractive index of the intended carrier or binder.

Figure 1C:
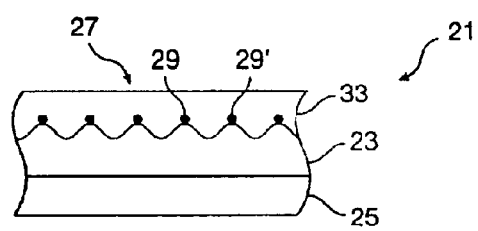

FIG. 1C is a simplified cross section of a portion of a diffractive flake 21 according to another embodiment of the invention. An embossed layer 23 is formed on a substrate, such as a PET flake or film 25. A discontinuous layer of magnetic material is deposited on the diffraction grating pattern 27 to form magnetic needles 29, 29' (protruding in the direction from the viewer into the paper). The needles can form on the tops, sides, or valleys (bottoms) of the grating pattern, depending on nature of the pattern and deposition parameters. A clear top layer 33 is formed over the magnetic needles and embossed layer, such as a layer of thermosetting or thermoplastic polymer that is fluidized at some point to flow and form the flat surface. The illustrated top layer is relatively flat, but could follow the pattern of the embossed layer. In an alternative embodiment, the top layer could be a layer of reflective material, or a layer of reflective material could be included between the embossed layer and the top layer, typically overlying the magnetic needles. If the embossed layer is formed on a film substrate, laser-cutting or other techniques can be used to process the film into flakes. It is generally desirable that the flakes have a suitable aspect ratio of surface area to thickness to promote the flakes to align (i.e. flatten out or "leaf") to the surface that they are applied to, such as in a paint vehicle or an ink vehicle. An example would be a flake nominally 100 microns×100 microns or 50×50 microns and about 10–15 microns thick.

Figure 1D:
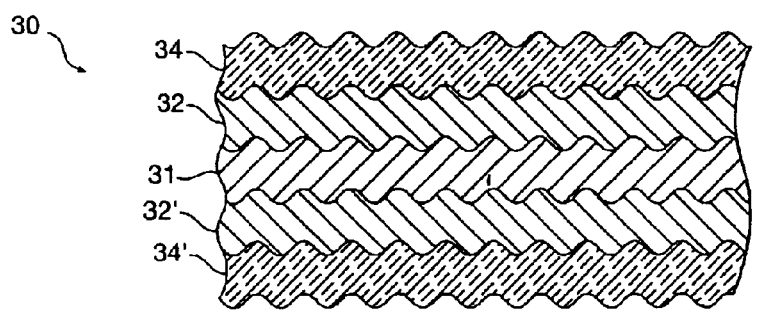

FIG. 1D is a simplified cross section of a portion of a diffractive flake 30 according to another embodiment of the present invention. The diffraction grating pattern in the reflector layers 32, 32' is replicated from a deposition substrate. For example, a polymer film can be embossed with a grating pattern. The first clear layer 34' is deposited on the embossed film (typically over a release layer, which is not shown as it is removed when the flake is separated from the deposition substrate), and then the first reflector layer 32'. A layer of magnetic material 31 is deposited, then another reflector layer 32, and another clear layer 34. The coated layers are then separated from the embossed deposition substrate and processed to form the desired diffractive flakes. Such techniques can be used in a roll-coating system. Alternatively, the diffraction grating pattern can be embossed on a flake substrate, such as a magnetic flake substrate, and then the reflector layers and subsequent layers can be deposited on the flake substrate. Similarly, a single reflector layer can be used with magnetic needles formed on one or more surfaces of one of the clear layers or reflector layer, and the magnetic layer omitted.

Flakes according to embodiments illustrated in FIGS. 1A–1D can be magnetically oriented within the plane of the flake if the flake is appropriately shaped. Generally, if the flake, which is relatively flat and has an aspect ratio of minimum transverse dimension to thickness of at least 2:1, and more typically greater than about 100:1, is longer in one surface dimension than another, then the flake will tend to align itself in a magnetic field to minimize the field energy.

III. Exemplary Flake Shapes

Figure 2A:
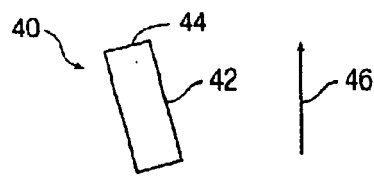
FIGS. 2A and 2B are simplified plan views of shaped flakes according to embodiments of the present invention.

FIG. 2A is a simplified top view of a magnetic flake 40 according to an embodiment of the present invention. The magnetic flake is a pigment flake that includes a magnetic material. The magnetic material can be essentially uniform in the plane of the flake, e.g. a flat sheet or a layer patterned with the diffraction grating, or the magnetic material can be patterned, such as in "stripes", such as are discussed in conjunction with FIGS. 3A and 3B, below. Although embodiments with stripes of magnetic material would not require the flakes to be in any specific shape to allow magnetic alignment of the flake, it may be desirable to pattern the flake to have a long axis generally parallel to the magnetic stripes. The flakes may be intentionally shaped, or may be shaped as an artifact of the flake or substrate manufacturing process, and may be sorted to improve the percentage of flakes with suitable shapes. While a high percentage of strongly magnetically orientable flakes is generally desirable, it is not necessary that all the flakes be magnetically orientable to achieve suitable effects.

The magnetic flake 40 has a long side 42 and a short side 44. Flakes with suitable aspect ratios of length to thickness and in appropriate carriers tend to lie flat on surfaces that they are applied to. The aspect ratio between the length (long side) and width (short side) allow magnetic orientation within the plane of the flake. Carriers are typically liquid for a period to permit some motion of the flake before the carrier evaporates or hardens. Alternatively, the flake can be oriented prior to placement on a surface, and the carrier can dry or solidify essentially immediately. For example, ink might have a volatile carrier that evaporates to fix the flake, or a clear paint carrier, such as a clear paint base, might harden to fix the flake. Similarly, uncured thermosetting resin or heated thermoplastic resin might allow the flake to be oriented prior to curing or cooling, respectively, either before, during, or after application to a surface.

A flake having magnetic material placed in a magnetic field twists the magnetic field lines. The most stable condition of the flake in the field is when the flake pole points in the direction of the field. The flake typically rotates until its position becomes oriented to reduce the energy of the system. The torque experienced by the flake depends upon many factors, such as the magnitude of the magnetic flux, the magnetic structure in the flake, and the size of the flake (lever arm).

If a magnetic field, represented by the arrow 46, is applied, the shaped flakes 40 will tend to align themselves so that the longest dimension is essentially parallel to the lines of a magnetic field. The length of the long side relative to the short side is not limiting. Generally, the greater the aspect ratio of the surface of the flake, the greater the tendency to align along the applied magnetic field. It is not necessary that all flakes align with the magnetic field to produce a suitable optical effect. Typically, some flakes are not perfectly aligned, either along the diffraction pattern, or within the plane of the substrate.

Figure 2B:
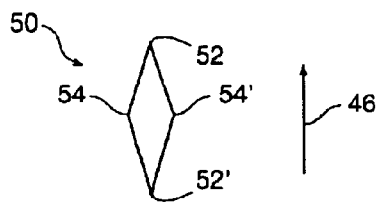

FIG. 2B is a simplified top view of a magnetic flake 50 according to another embodiment of the present invention. The flake is in the shape of a rhombus, commonly called a "diamond". The flake has a long axis, on which the sharper points 52, 52' lie, and a short axis, along with the broader points 54, 54' lie. In a magnetic field, represented by the arrow 46, the flakes tend to align so that the long axis is essentially parallel to the magnetic field, as discussed above in reference to FIG. 2A.

Many other shapes can produce magnetic flakes that will align in a magnetic field. The shapes shown in FIGS. 2A and 2B are desirable because they can utilize essentially all of the coated surface. Shaped flakes can be produced according to a variety of techniques. One approach is to pattern the deposition substrate in a roll coater to have surface features, such as relatively deep grooves or high ridges, in the desired particle shape that facilitates removal of the thin film layers from the deposition substrate in the desired shape, or in subsequent milling, grinding, or cutting operations. Alternatively, the substrate, such as a roll of PET film, can be laser-cut prior to separating the thin-film layers (flakes) from the substrate. An optional stiffening layer can then be applied to the thin-film stack and the stack (with the optional stiffening layer) separated from the cut substrate. In another embodiment, the thin-film stack is cut, but not the PET substrate. These techniques can be used to obtain flakes of a desired size without grinding, and may provide higher yields of flakes within a particular size range. The magnetic flake could include a Fabry-Perot-type interference structure and/or a diffractive grating on one or both major surfaces. The diffractive grating could be aligned so that the grooves align along the magnetic field, or the grooves could be at another angle with respect to the axis of orientation.

IV. Patterned Magnetic Layers

Figure 3A:
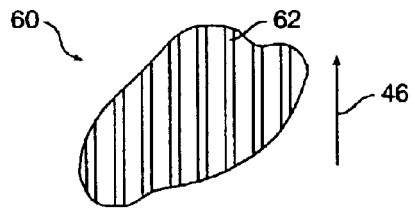
FIG. 3A is a simplified plan view of a shaped magnetic layer according to an embodiment of the present invention.

FIG. 3A is a simplified top view of a magnetic flake 60 according to another embodiment of the present invention. The flake is shown having an arbitrary, irregular shape, but could be selectively shaped. Stripes 62 of magnetic material have been deposited, and the stripes tend to align along the magnetic field 46. The stripes of magnetic material could be deposited through a shadow mask, for example. The stripes of magnetic material could be deposited on a deposition substrate in a roll coater, for example, or on the surface of the flake(s), or as an intermediate layer in the flake. The stripes can be relatively thin to avoid unduly affecting the optical characteristics of the flake.

Figure 3B:
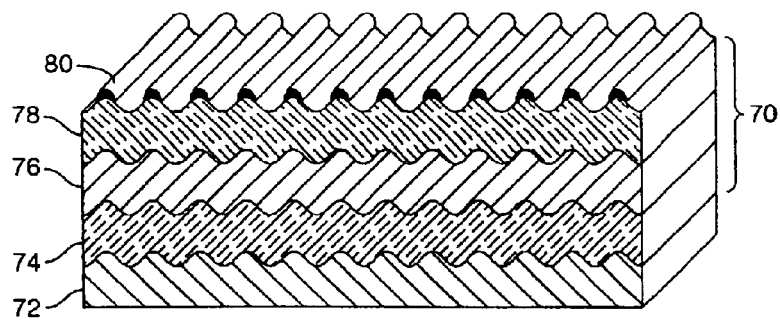
FIGS. 3B–3D are simplified cross sections of flakes according to embodiments of the present invention.

FIG. 3B is a simplified perspective view of a portion of a coating stack 70 on an embossed deposition substrate 72 shown with an edge in cross section. A first clear layer 74 of the coating stack is deposited on the embossed substrate. A reflector layer 76 is then deposited, and then a second clear layer 78. The diffraction grating pattern embossed on the deposition substrate is preserved throughout the layers. Magnetic "needles" 80 are formed on the high points of the diffraction grating structure. Other magnetic needles (not shown) might similarly form in the "valleys" between the ridges, or in some cases only on the ridges.

It is believed that the magnetic material preferentially deposits on the ridges and/or in the valleys due to nucleation kinetics or "shadowing" effects during the deposition. Differential vapor density between the bottoms of the grooves and the tops of the grooves, the slope of the grating side-walls might all affect how the magnetic material is deposited on the diffraction grating. In other words, there may be more than one reason such needles are formed.

Alternatively, a coating stack could include two reflector layers on either side of a stiffening layer, such as a layer of $MgF_2$. The reflector layers could be opaque aluminum. While $MgF_2$ is an essentially clear material, clarity is not essential for material(s) between the reflector layers. The magnetic layer could be deposited on the second aluminum layer to form magnetic needles, or elsewhere.

In one embodiment, the magnetic needles were formed by depositing a 50 nm-thick layer of nickel on the second clear layer using e-beam evaporation. It was found that a 200 nm-thick layer of nickel did not form the needles, but could be used to form magnetic flakes according to the present invention if the flakes themselves were shaped. It is believed that the thinner layer of nickel is at least magnetically discontinuous and forms magnetic needles aligned with the diffraction grating pattern. Some needles might be at least partially joined with thin sections of magnetic material, but very thin sections might not be able to form strong magnetic domains, hence the layer is magnetically discontinuous. In some instances, the magnetic film (layer) might have a variable thickness. A stronger magnetic torque is provided in the direction of the diffraction grating, thus facilitating alignment of the particles in a magnetic field. It is further believed that layers of nickel thinner than 50 nm may form discontinuous magnetic layers aligned with some diffraction grating patterns, and that magnetic layers between 50 nm and 200 nm thick might form needles in some instances.

A grooved diffraction grating can also facilitate fabricating flakes with desirable shapes. In some embodiments, the thin film stack tends to break along the grooves of the diffraction grating. This results in flakes with a longer dimension in the direction of the grooves, and a shorter dimension across the grooves. This sort of aspect ratio can facilitate magnetic or fluid alignment of the resultant flakes to form an image.

It is generally desirable to avoid flakes that are permanently magnetized prior to mixing with an ink or paint vehicle or applying to a substrate to form an image, as they tend to clump together. Sufficiently thin layers of magnetic material avoid significant permanent magnetization of the flakes. If little magnetic material is present in the flake, it may require a stronger magnetic field to align the pigment flakes during application, or to apply the magnetic field for a longer period, in which case a carrier that remains fluid longer may be appropriate.

Figure 3C:
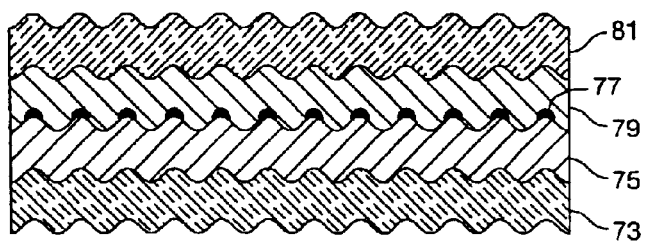

FIG. 3C is a simplified cross section of a magnetic diffractive flake 71 according to another embodiment of the present invention. The flake is made by depositing thin-film layers on an embossed substrate, such as embossed PET film, separating the thin-film layers from the deposition substrate, and then grinding and sorting the flake to the desired size. The flake includes a first layer of $MgF_2$ 73, a first layer of aluminum reflector 75, an 50 nm layer of nickel 77 forming a magnetically discontinuous layer illustrated as needles on the peaks of the grating, a second layer of aluminum 79 and a second layer of $MgF_2$ 81.

Figure 3D:
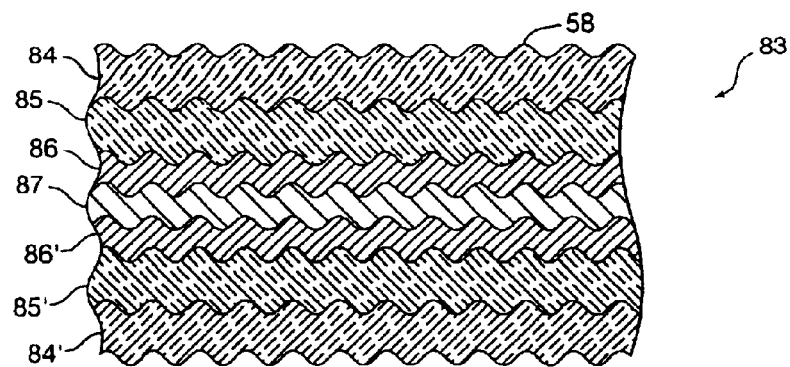

FIG. 3D is a simplified cross section of a color-shifting diffractive flake 83 according to an embodiment of the invention. The flake is symmetrical with an absorber layer 84, a spacer layer 85, a reflector layer 86, a magnetic layer 87, which in some embodiments has a thickness selected to form a magnetically discontinuous layer, i.e. magnetic needles, on a diffraction grating, and another reflector layer 86', spacer layer 85', and absorber layer 84'. The diffraction grating can be embossed onto a roll coating substrate, such as film of PET with an embossed layer. The order of the layers is merely exemplary, and non-symmetrical or asymmetrical pigments may be made.

A green-blue color-shifting diffractive flake was made by depositing a first absorber layer of chromium 8 nm thick, a first spacer layer of $MgF_2$ of four quarter-wave optical thickness at 530 nm, a first reflector layer of aluminum 80 nm thick, a magnetic layer of nickel 50 nm thick, a second reflector layer essentially similar to the first reflector layer, a second spacer layer essentially the same as the first spacer layer, and a second absorber layer essentially the same as the first absorber layer. The layers were deposited on an embossed film (web) in a roll coating machine, and were separated from the web and processed into flakes.

A gold-to-silver color-shifting diffractive flake was made by depositing a first absorber layer of chromium 8 nm thick, a first spacer layer of $MgF_2$ of two quarter-wave optical thickness at 605 nm, a first reflector layer of aluminum 80 nm thick, a magnetic layer of nickel 50 nm thick, a second reflector layer essentially similar to the first reflector layer, a second spacer layer essentially the same as the first spacer layer, and a second absorber layer essentially the same as the first absorber layer. The layers were deposited on an embossed film (web) in a roll coating machine, and were separated from the web and processed into flakes.

A silvery flake was made by depositing a layer of $MgF_2$ of four quarter-wave optical thickness at 530 nm, a magnetic layer of nickel 50 nm thick, and another layer of $MgF_2$ of four quarter-wave optical thickness at 530 nm. It is believed that tinted (transparent colored) dichroic or color-shifting diffractive pigments may be made using alternating layers of high-index and low-index dielectric materials, and a magnetic oxide such as $Fe_3O_4$. A diffraction grating pattern may be imparted to the flakes by depositing the layers on a patterned (e.g. embossed) substrate from which the flakes are subsequently separated. An example of a nominally five-layer design would be a HLHLH stack where H represents a layer of high-index material and L represents a layer of low-index material having selected optical thicknesses. A layer of magnetic material might be deposited at any number of positions in the stack, such as on the center H layer. Other designs, such as 7-layer or 9-layer designs may be desired. Similarly, an LHLHL-type configuration may be desirable, including 7-layer and 9-layer designs, as well as designs with more or fewer layers.

V. Printable Images

Magnetic pigment particles with diffractive gratings according to embodiments of the present invention can be used to create a number of effects, such as DOVIDs or polarizers. Generally, when a diffractive grating is illuminated, an observer looking in a direction essentially perpendicular to the grooves of the grating will see diffracted light, while the observer will not see the diffracted light when looking along the grooves in the grating. Thus, the appearance of the pixel changes with rotation of the viewing angle. The difference in appearance can include color travel as well as lightness. It may be desirable to align diffractive pigment flakes to obtain a stronger diffractive effect, or to create images, such as pixelgrams, dot images, or kinegrams. For example, a more pronounced optical effect is generally achieved if more flakes are lying in the same plane, which is typically the plane of the substrate. Effects can be obtained by selecting the orientation of the diffraction gratings, or by using diffraction gratings having different spacings. For example, one region of the device might have flakes with a linear grating spacing of 1,400 lines/mm, while another region might have flakes with a linear grating spacing of 2,000 lines/mm. One region might appear green, while the other region appears red. A viewer would observe different optical effects from each region as the angle of view was changed.

Figure 4:
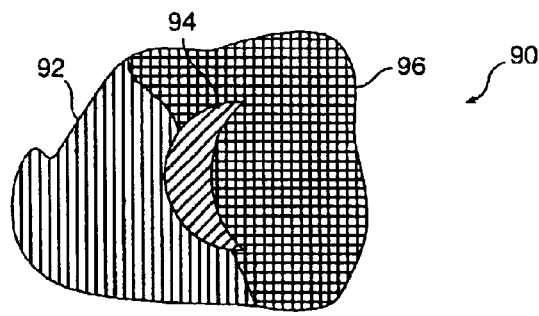
FIG. 4 is a simplified plan view of an image according to an embodiment of the present invention.

FIG. 4 is a simplified top view of an image 90 printed with diffractive pigment flakes according to an embodiment of the present invention. The image is shown as having an arbitrary perimeter and three fields, each field being indicated by a pattern representative of a grating pattern of diffractive flakes in that field. A first field 92 is printed with ink containing a first type of diffractive pigment with a grooved diffraction grating of relatively fine pitch. In one example, the diffractive pigment flakes in the first field are not aligned. A second field 94 is printed with ink containing a second type of diffractive pigment flakes with a grooved diffraction grating of coarser pitch. In this example, the diffractive pigment flakes are not necessarily aligned, but have a different grating pattern, illustrated by the higher spacing between the lines in the second field. A third field 96 is printed with ink having diffractive pigment flakes with a cross grating, for example. This third field is included only to illustrate that the pigment flakes in different fields could have a different spacing, or have a different pattern, and only two types of fields are needed to make an image.

In other instances, the diffractive pigment flakes in one or more fields could be aligned in a selected direction. For example, the pigment flakes in the first field 92 could be aligned so that the diffraction grating is aligned more or less along the lines in the field. The pigment flakes in the second field 94 could be aligned in a different direction, or be random. In fact, they could be the same type of flakes used to print the first field. The image would appear when viewed under light at an appropriate angle, or when the printed medium is rotated.

If the first 92 and second 94 field were printed with similar flakes, one field magnetically aligned and the other not aligned or aligned at a different angle, no image might appear under some viewing conditions, the image appearing to be a uniform field, such as a silver or light gray field. As the image, light source, and/or viewing angle is varied, the image will appear.

Other types of images may also be produced using diffractive pigment techniques. Many images are composed of a number of picture cells ("pixels") or dots. Images may be simple images, or may be holographic. Some DOVIDs can appear to be a 3-dimensional image of an object, other DOVIDs can change images with viewing angle, or appear to impart motion to an image.

Figure 5:
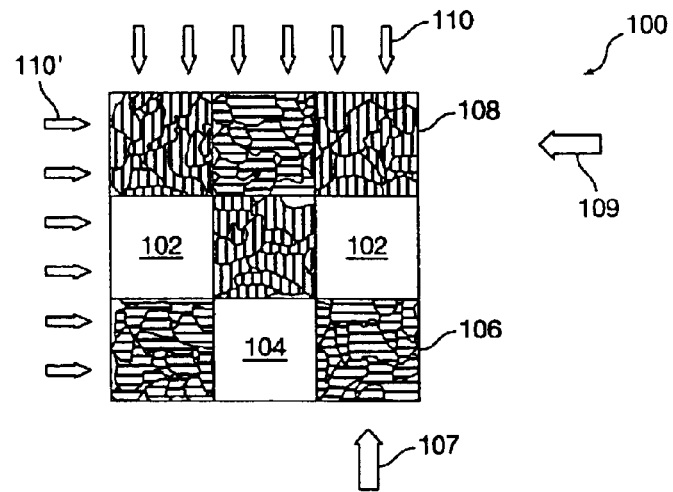
FIG. 5 is a simplified diagram of a portion of a DOVID according to an embodiment of the present invention.

FIG. 5 is a simplified top view of a portion of an image 100 printed with magnetically oriented diffractive flakes. The portion of the image is composed of nine pixels laid out on essentially a grid. This configuration is exemplary only, and the pixels do not have to be square, or be the same shape or size. Other embodiments may use dots instead of pixels to form an image(s).

In many applications, pixels are at least rectangular and have the same size. In some applications the pixels do not abut one another, and a narrow "alley" of unprinted area separates the pixels. Some of the pixels 102 are optionally unprinted. Other pixels 104 are optionally printed in plain ink, either black ink or colored ink. Similarly, pixels may be printed with ink having non-magnetic diffractive pigment, or with randomly oriented magnetic diffractive pigment flakes. The other illustrated pixels are printed with ink that includes magnetic diffractive pigment flakes that have been oriented in a selected direction.

The magnetic diffractive pigment flakes are oriented within a pixel by providing a magnetic field before, during, and/or after application of the ink. For simplicity of discussion and illustration, the pixels are shown as having a plurality of randomly shaped particles. In another embodiment the pixels could contain selectively shaped magnetic diffractive flakes. The term "oriented" means that the diffraction gratings on the oriented flakes are sufficiently aligned to produce an aggregate effect distinguishable from the effect observed from similar, but randomly oriented, flakes. "Oriented" means that a majority of flakes are aligned in such a way that their grooves are parallel or almost parallel. In another embodiment, diffractive flakes are not aligned in any pixel, but the diffraction grating pattern is different in different pixels, and several different diffraction gratings may be used in each of several pixels. In further embodiments, different diffraction grating patterns are used, and one or more of the pigment flakes are aligned in a selected fashion.

The diffraction pattern on the flakes is represented by parallel lines 106, 108 that run in a horizontal or vertical direction in the illustration. The gratings do not have to align with a pixel edge, and an image may contain several different sets of aligned pixels and/or dots. Each area grating (pixel) can diffract light in a selected direction under a particular common oriented beam of white light, represented by the box arrows 110. The light is diffracted in a direction normal to the dominant grating direction, i.e. light is diffracted horizontally from vertically aligned pixel gratings, and vertically from horizontally aligned pixel gratings.

Generally, the flakes with "horizontal" lines have an aggregate effect so that the direction of viewing represented by the box arrow 107 would provide diffracted light from those pixels, and similarly for the vertically aligned diffraction gratings, which would diffract light in the direction of view represented by the box arrow 109. To see the image produced by the vertically aligned pixel 108, the incident light should be from the direction of the arrows 110', and viewed from the box arrow 109.

In other embodiments, a set of pixels could contain flakes with crossed diffraction gratings. It is not necessary that the image contains equal numbers of types of pixels, and pixels having the same diffraction grating orientation could adjoin one another. It is understood that not all flakes need to be perfectly aligned with one another within a pixel.

Different linear grating frequencies and/or orientation of the grooves can be used for each "type", i.e. alignment direction or grating period, of pixels. In some embodiments, pixels might contain randomly oriented diffractive pigment flakes having different diffraction gratings in different pixels to form images. Different images can be constructed using different ensembles of types of pixels. This can produce an effect of animation for each of the images obtained with a set of pixels as the viewing angle changes or the printed object is rotated. Similarly, more than one image can be constructed on a printed area by an appropriate distribution of different types of pixels. The relative sizes of flakes and pixels is not to scale. Generally, a pixel is on the order of about 50 microns to about 1,000 microns, while the diffractive flakes are typically on the order of about 5 microns to about 50 microns across.

Figure 6A:
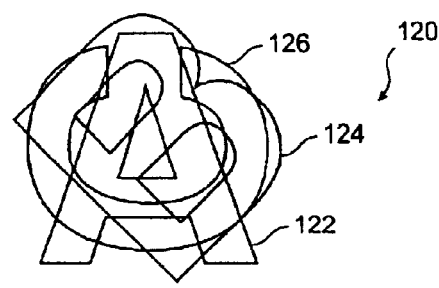
FIGS. 6A–6D are simplified diagrams illustrating a type of image according to an embodiment of the present invention.

FIGS. 6A–6D illustrate how different images can appear when an optically variable image is printed with magnetically orientated diffractive pigment flakes. FIG. 6A is a simplified top view of a printed DOVID 120. Three letters, "A" 122, "B" 124, and "C" 126 have been printed with overlapping regions. Only the outlines of the letters are shown in this figure for simplicity of illustration. The actual DOVID could be embedded in a non-diffractive or randomly diffractive field. For example, the background, which is plain paper in FIG. 6A, could be printed with the same ink as the letters, but not magnetically aligned, or printed with non-diffractive ink, or left blank.

The image of each letter is composed of several pixels. The set of pixels composing a single letter includes pixels with diffractive pigment flakes oriented in a particular direction. When a viewer looks at the DOVID from a direction essentially perpendicular to diffractive gratings of the diffractive pigment flakes composing the image, the viewer observes that image. The viewer observes the other images when his angle of view changes, as by rotating the DOVID, for example. If one or more of the letters was printed with a diffractive pigment having a thin-film interference structure, tilting the image would provide a color-shifting feature as well as diffractive color travel.

In the regions where one image overlaps another, the pixels for the various images are interleaved, that is, diffractive pixels composing the letter "A" are interspersed with diffractive pixels composing the letters "B" and "C". It is not necessary that each image have a comparable number of pixels in the overlapping regions, and some pixels may be unprinted, printed with non-diffractive ink, or printed with randomly oriented diffractive pigment flakes to adjust the density or other characteristics of the image.

Photo-copying the DOVID on a copier would not preserve the optically variable effect of the image. A letter or letters might appear, but the image would not change with rotation. Thus, printed DOVID can serve as security or authenticity features on documents or other objects. Covert security might be provided by diffractive pigments having grating spacing greater than 3,000 lines/mm, which could be invisible to the unaided eye, but detected with an ultra-violet camera or detector.

Figure 6B:
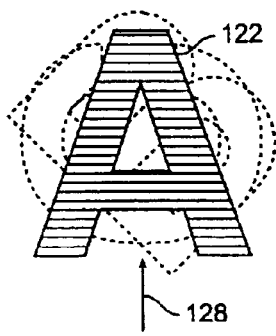
Figure 6C:
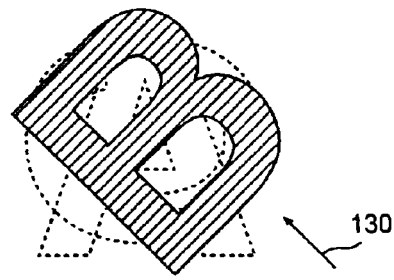
Figure 6D:
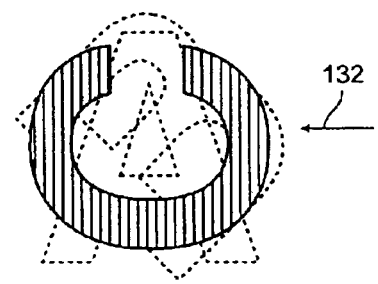

FIG. 6B is a plan view of the DOVID of FIG. 6A when viewed from the direction indicated by the arrow 128. The other letters are represented by dashed lines to represent that they would not be prominent from this direction because the oriented diffractive flakes of the pixels composing these letters would not diffract light in the viewing direction. FIG. 6C is a plan view of the DOVID of FIG. 6A when viewed from the direction indicated by the arrow 130, and FIG. 6D is a plan view of the DOVID of FIG. 6A when viewed from the direction indicated by the arrow 132. The lines across the letters in FIGS. 6B–6D represent the aggregate effective diffraction grating pattern for the oriented diffractive pigment flakes in pixels making up the respective images.

Figure 7:
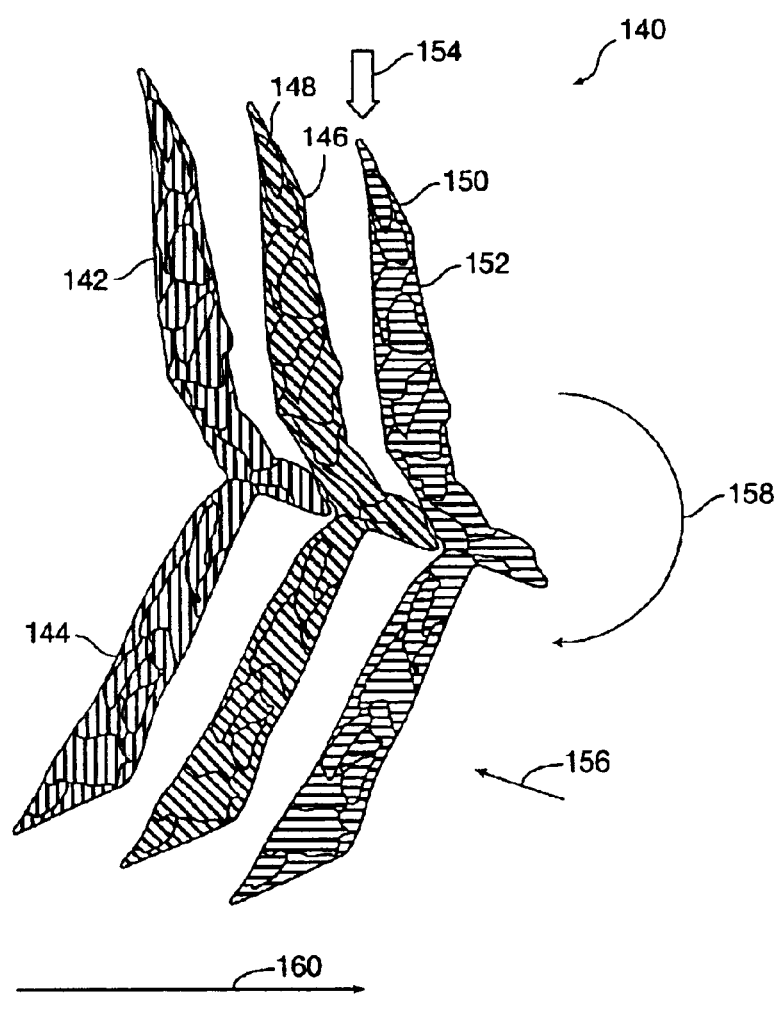
FIG. 7 is a simplified diagram illustrating a kinegram according to another embodiment of the present invention.

FIG. 7 is a simplified representation of a kinegram 140 illustrating how an image might appear to move across the page as the page is rotated. A first version of the image 142 is printed with oriented diffractive pigment flakes aligned in a first direction, represented by the vertical lines 144 indicating the predominate direction of diffraction grooves on the pigment flakes. A second version of the image 146 is printed with the diffraction grooves at a non-vertical angle, represented by lines 148, and a third version of the image 150 is printed with the diffraction grooves essentially horizontal, as represented by lines 152. The illumination source is represented by the box arrow 154, and the initial direction of view is represented by the arrow 156.

As the DOVID is rotated in the direction of the curved arrow 158, the image appears to travel in the direction of the arrow 160. All three versions of the image could be printed on a background of similar ink with randomly aligned diffractive flakes so that the image would not be prominent unless viewed under the correct conditions.

Other effects can be obtained using diffractive magnetic pigment flakes. In one case, an annular magnet was placed behind a piece of card stock. Diffractive magnetic pigment in a clear binder was drawn across the side of the card stock opposite the magnet with a doctor blade (essentially a thin, narrow stainless-steel spatula). The resulting image gave the impression of a true three-dimensional "fish-eye". It is believed that the diffractive magnetic pigment flakes were aligned by both tilting and rotating flakes along the magnetic field lines. In another instance, the pigment was applied as a spray paint.

VI. Methods of Application and Alignment

Magnetic pigment flakes can be aligned in a number of fashions. A magnetic field can be used to align the pigment flakes before, during, or after applying the pigment onto a medium, or a magnetic field can be applied at several parts of the process, or throughout the process. For example, a magnetic field may be applied to align or pre-align the flakes before application by a printing, dying, powder-coating, or painting device, and a magnetic field may be applied after the pigment flakes have been applied to a medium. Similarly, the application device, such as the spray head, roller, or screen may be magnetized to align the pigment flakes as they are applied to the medium. Examples of suitable media include paper, plastic, metal, wood, leather, and fabric. Exemplary printing techniques include gravure, stamping, Intaglio, flexographic, silk-screen, jet, and lithographic printing, and images may produced using a combination of printing techniques. Diffractive pigments might also be aligned during extrusion or injection molding of plastic articles or films, either with a magnetic field or as a result of fluid tending to align the diffraction grating along the direction of flow.

If a printing technique using a transfer roller is used, the ink source (container) may be magnetized to orient the pigment flakes before they are picked up by the roller. The orientation is substantially preserved as the flakes are transferred to the intended medium. Similarly, in a screen printing technique a magnetic field may be applied across the screen or screen elements to align the pigment flakes, or the squeegee may be magnetized to align the flakes as the ink or paint is drawn across the screen. In that case, different orientations of the flakes are obtained simply by changing the direction of the draw.

Printed or painted images may be used in many applications. For example, printed DOVIDs may be used as security or authentication features on bank notes, traveler's checks, software media, and credit cards. The DOVIDs may be printed directly on the media or may be printed on a transfer film or foil, such as a hot foil, that is then applied (hot pressed) to the media. Either approach provides a DOVID without having to make a master hologram. This in turn allows flexibility in what images are provided. For example, a diffractive optically variable date code could be used. Making a master hologram, especially for a single use, using conventional techniques would be expensive and time consuming in comparison. However, counterfeiters have obtained access to apparatus for making a master hologram, so such devices are becoming easier to counterfeit.

In other cases, the medium itself may be magnetized. For example, an emblem or logo might be produced on a steel panel by imparting remnant magnetization in a selected pattern to the steel pattern. Paint containing magnetic pigment flakes would align in the areas having sufficient magnetic field, and not align in areas with little or no field. Similarly, a magnetic template with permanent and/or electromagnets or magnetic fluid could be placed behind a panel, such as a metal, plastic, or wooden panel, to align the pigment flakes after they are applied to the panel. Other techniques could apply or embed magnetized wires or particles in or on a medium, or to apply a magnetic fluid to the side of the substrate opposite the pigment flakes. Magnetic diffractive pigment particles in a paint or ink that were subsequently applied would then align to the magnetized material. The orientation of the diffractive pigment could also align other non-magnetic particles, such as micro-wires, that would not otherwise be oriented. Flakes might be aligned before application to the surface of the substrate, such as by using filtered cathode arc deposition to align the flakes during their trajectory to the substrate.

Many different carriers may be used with pigment flakes according to embodiments of the present invention. A paint vehicle may be combined with the pigment flakes to provide a paint formulation, an ink vehicle may be combined with the pigment flakes to provide an ink formulation, or a powder-coating binder may be combined with the pigment flakes to form a powder-coating formulation, for example. Powder coating material should be pre-formulated because during application the magnetic pigment may spread so that only a small portion will reach the article being coated. In some applications, such as fast drying ink formulations, the vehicle or carrier may be relatively volatile, or be rapidly absorbed into the medium, such as a paper. Techniques aligning the pigment flakes before application may be compatible with such fast-drying or fast-setting carriers. For example, with gravure printing, the ink receiver can be magnetized before the idlers pick up the ink.

Other techniques may use slower drying or slower setting carriers. For example, an automotive paint formulation might use a polyurethane carrier that stays relatively fluid for at least several minutes. The flakes could be aligned prior to application, the orientation being preserved when the paint cured, or could be applied with random orientation and subsequently aligned by applying a magnetic field. The flakes typically lie along the surface of the medium, facilitating orienting the diffraction grating in the plane of the flake. Other carriers might remain fluid until selectively cured, such as a carrier that is cured using infrared, ultraviolet or other light, or heat.

In other embodiments, magnetic diffractive pigment flakes can be included in polymeric films, such as extruded films. The extrusion process generally aligns the flakes in the plane of the film, and a magnetic field can be applied as the film is extruded to align the diffraction gratings in the plane of the flake. Similarly, magnetic diffractive pigment flakes could be cast in a polymer, and magnetically aligned before casting or while the polymer was still fluid. Such techniques could include aligning the plane of the flake, as well as the rotational orientation of the diffraction grating in the plane of the flake.

Examples of materials that might be used in polymeric films include aqueous polymer, such as a polyvinyl alcohol, polyvinyl acetate polyvinylpyrrolidone, poly(ethoxyethylene), poly(methoxyethylene), poly(acrylic) acid, poly(acrylamide), poly(oxyethylene), poly(maleic anhydride), hydroxyethyl cellulose, cellulose acetate and poly(sacchrides) such as gum arabic and pectin may be used. If an organic solvent base is to be utilized, almost any polymer system that is dissolvable may be used. This may include those polymers listed in the aqueous examples above but will also include the additional polymers of poly(acetals), such as polyvinylbutyral, poly(vinyl halides), such as polyvinyl chloride and polyvinylene chloride, poly(dienes) such as polybutadiene, poly(alkenes) such as polyethylene, poly(acrylates) such as polymethyl acrylate, poly(methacrylates) such as poly methylmethacrylate, poly(carbonates) such as poly(oxycarbonyl oxyhexamethylene, poly(esters) such as polyethylene terephthalate, poly(urethanes), poly(siloxanes), poly(suphides), poly(sulphones), poly(vinylnitriles), poly(acrylonitriles), poly(styrene), poly(phenylenes) such as poly(2,5 dihydroxy-1,4-phenyleneethylene), poly(amides), natural rubbers, formaldehyde resins and other polymers.

Figure 8A:
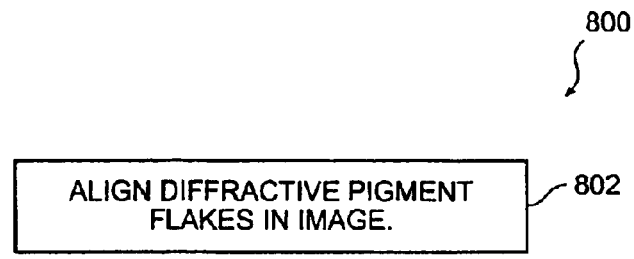
FIGS. 8A–8C are simplified flow charts of methods according to embodiments of the present invention.

FIG. 8A is a simplified flow diagram of a method of forming an image on a medium 800 according to an embodiment of the present invention. Diffractive pigment flakes are aligned in a first field of the image (step 802). The alignment may occur before the diffractive pigment flakes are applied to the medium, during application, and/or after application.

Figure 8B:
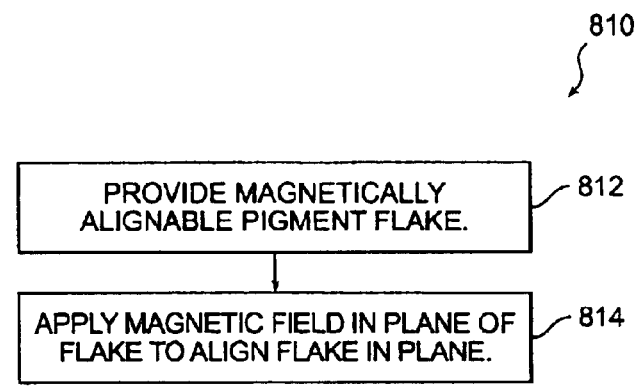

FIG. 8B is a simplified flow diagram of a method of aligning a pigment flake 810 according to another embodiment of the present invention. A pigment flake having a magnetic structure alignable in the plane of the flake is provided (step 812). The magnetic structure could be an essentially uniform layer of magnetic material capable of being aligned due to the shape of the flake, or could be a non-uniform layer of magnetic material, such as stripes or needles formed on a diffraction grating. A magnetic field is applied across the pigment flake to align the pigment flake in the plane of the flake (step 814). In a particular embodiment the magnetic pigment flake has a diffraction grating and the diffraction grating is aligned in a selected orientation according to the applied magnetic field.

Figure 8C:
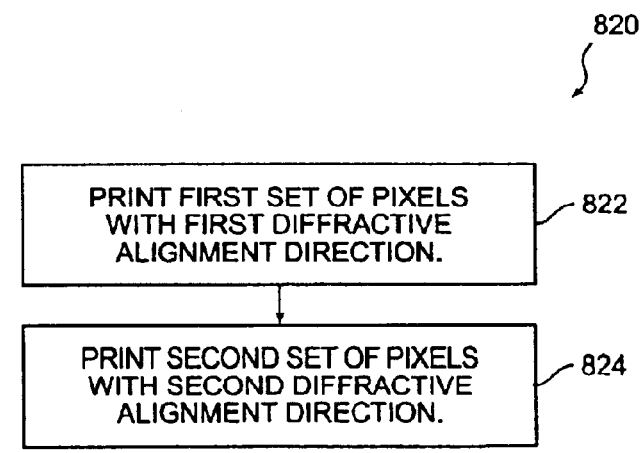

FIG. 8C is a simplified flow diagram of a method of printing an optically variable image 820 according to another embodiment of the present invention. A first plurality of pixels having diffractive pigment flakes aligned in a first selected direction are disposed on a medium (step 822). A second plurality of pixels having diffractive pigment flakes aligned in a second direction are disposed on the medium (step 824). Additional pixels with diffractive flakes aligned in additional directions may be included. The alignment can be in the plane of the foil, or tilted at a desired angle. The order of the steps is not limiting, and some processes may allow the different sets of pixels to be concurrently applied to the medium. Other pixels may be printed with non-oriented diffractive pigment flakes, or non-diffractive pigment, or left blank. Similarly, the optically variable image or a portion of the image might be printed over another image, or another image might overly the optically variable image or a portion of the image.

The flakes can also be aligned at a desired tilt, as well as at a desired orientation of the diffraction grating by applying a magnetic field that is not in-plane with the medium that the flakes are applied to. For example, an end pole of a bar magnet can be placed underneath a card across which diffractive flakes have been spread. The curving field lines produce a dramatic and unusual effect of a three-dimensional "eye". Similar effects were obtained using the edges of bar, disk, and annular magnets. When the face of an annular magnet was placed against the backside of the card, a multiple, three-dimensional ringed effect was produced in the diffractive pigment. Magnetic diffractive pigments were applied to media using a variety of techniques, including screening, spreading, and spraying.

VII. Experimental Results

Several types of magnetic diffractive pigment flakes were made and tested for optical properties. The flakes were generally made by depositing thin film layers on embossed PET film, and then separating the thin film layers from the deposition substrate and grinding and sorting the flakes. The flakes were then mixed with a binder, such as 150K™ basecoat sold by E.I. DU PONT DE NEMOURS AND COMPANY, as a carrier. Other suitable binders and carriers are available, such as CHROMASYSTEMS binders and basemakers, also from E.I. DU PONT DE NEMOURS AND COMPANY, and other products from other suppliers. The mixture was spread onto a card using a doctor blade to draw down the pigments. Drawing the doctor's blade across the card generally flattens the pigment flakes in the plane of the card. One magnet was placed at an edge of the card so that the magnet's north pole was next to the card's edge. A second magnet wars placed at the opposite edge of the card with it's south pole adjacent to the edge of the card. This established a magnetic field between the north pole of the first magnet and the south pole of the second magnet. The flakes were drawn across the area between the magnets, which were about seven inches apart, to align the diffraction gratings. Thus, the aligned diffractive pigment flakes emulated a foil that might be produced by conventional techniques using a master hologram, or a continuous sheet of embossed reflector.

In another example, a magnetic field was applied after drawing down the pigment flakes. The carrier remained sufficiently fluid while opposing (north-south) magnetic poles were placed facing each other beneath the card across which the pigment flakes had been drawn. The pigment flakes had magnetic needles formed along the diffraction grating pattern, and the magnetic needles aligned themselves along magnetic field lines between the poles.

A goniospectrophotometer was used to measure the color travel of the samples. A scanning mask was used on the photodetector. The "a" axis represents green in the negative direction and red in the positive direction, and the "b" axis represents blue in the negative direction and yellow in the positive direction, in accordance with standard CIE™ $_{LAB}$colormetric conventions. Generally speaking, the further the curve is from the origin, the more chromatic the color for a given lightness when viewed from that direction. Absolute viewing angles are omitted for clarity of illustration, but the data points are approximately 2 degrees apart.

Figure 9A:
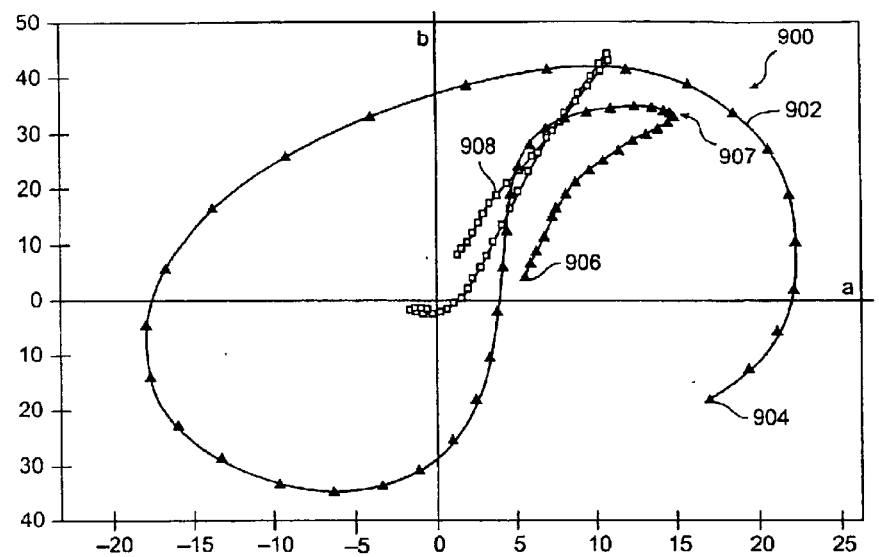
FIGS. 9A–9E are color scans of aligned diffractive pigment flakes according to various embodiments of the present invention.

FIG. 9A is a simplified graph 900 of the color travel of magnetically aligned diffractive pigment flakes according to an embodiment of the present invention. The, pigment flakes were made on PET film that was embossed with 1400 lines/mm, and then stripped from the deposition substrate. The flake structure was $MgF_2$—Al—Ni—Al—$MgF_2$ (See generally FIG. 3C). The magnesium fluoride layers were about 400 nm thick to provide rigidity to the resultant flakes and ease of handling and processing. They are not required for optical properties, and other materials may be used. In some embodiments, such layers can be used to provide environmental protection or index-matching. The aluminum layers were about 80 nm thick, which provided generally opaque, bright reflectors. Thinner or thicker reflector layers could be used, or omitted in other embodiments. The nickel layer in this and the embodiments illustrated in FIGS. 9B–9E was approximately 50 nm thick, and appeared to deposit along the grooves, producing magnetic needles. This flake exhibited a bright silver appearance.

The first curve 902 shows the color travel of the sample illuminated with an incident light beam at 45 degrees and perpendicular to the applied filed or to the diffraction grating (applied magnetic field) as the sample, i.e. groove orientation, is rotated between about −33 degrees 904 and about 80 degrees 906, with essentially specular reflection 907 occurring at viewing angles of about 45 degrees. The second curve 908 shows the color travel of the sample illuminated with the incident light beam parallel to the diffraction grating as the sample is rotated through essentially the same arc. The first curve 902 shows a high degree of color travel compared to the second curve 908. The essentially out-and-back nature of the second curve from the origin shows relatively little color travel, which is characteristic of no diffractive interference effects.

Figure 9B:
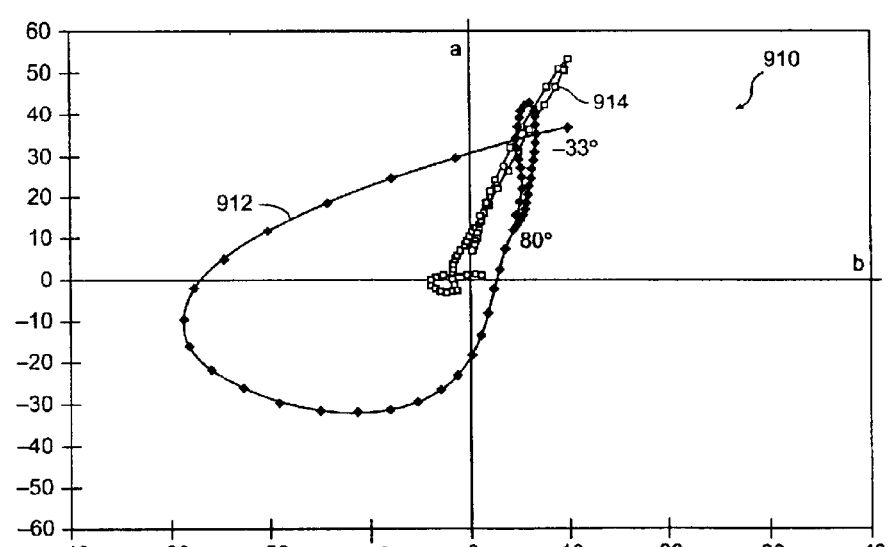

FIG. 9B is a simplified graph 910 of the color travel of magnetically aligned diffractive pigment flakes according to an embodiment of the present invention. Magnetic diffractive flake was made substantially the same as the example illustrated in FIG. 9A, but with a grating of 2000 lines/mm embossed on the deposition substrate. The resultant flakes were similarly mixed in a carrier and spread on a card using a doctor's blade to draw down the flakes between two magnets that provided a magnetic field in the plane of the card to align the flakes. All samples were analyzed at 45 degrees incidence and from viewing angles of minus 33 to 80 degrees in steps of two degrees.

The first curve 912 shows the color travel of the sample illuminated with an incident beam perpendicular to the aggregated diffraction gratings of the flakes. The second curve 914 shows the color travel of the sample illuminated with the incident beam perpendicular to the aggregated diffractions gratings. This sample showed wide color travel with the illumination source perpendicular to the magnetic field through some angles of viewing, but relatively little color travel or chromaticity over the remainder of the range. The second curve shows relatively low color travel.

Figure 9C:
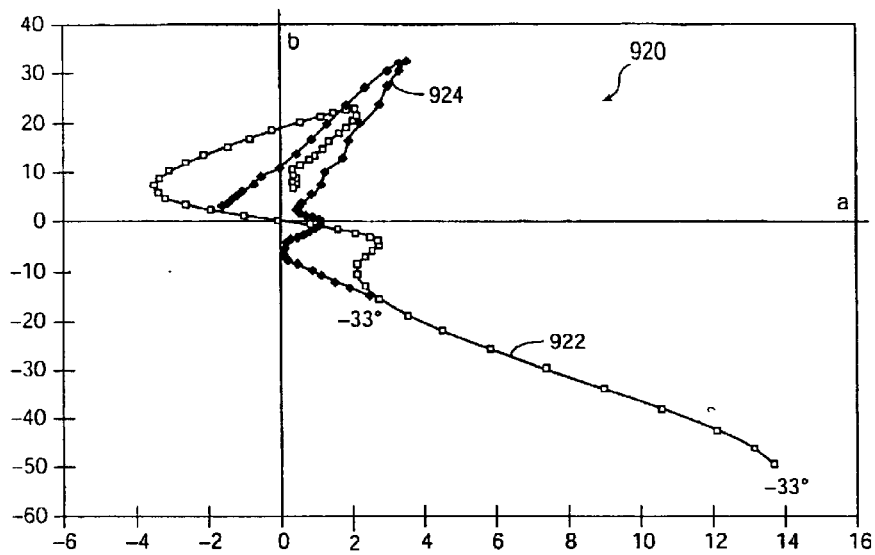

FIG. 9C is a simplified graph 920 of the color travel of magnetically aligned diffractive pigment flakes according to an embodiment of the present invention. Note the scale change on the "a" axis and on the negative "b" axis. Magnetic diffractive flake was made substantially the same as the example illustrated in FIG. 9A, but with a grating of 3000 lines/mm embossed on the deposition substrate. The resultant flakes were similarly mixed in a carrier and spread on a card using a doctor's blade to draw down the flakes between two magnets that provided a magnetic field in the plane of the card to align the flakes.

The first curve 922 shows the color travel of the sample illuminated with an incident beam perpendicular to the aggregated diffraction gratings of the flakes. The second curve 924 shows the color travel of the sample illuminated with the incident beam perpendicular to the aggregated diffractions gratings. This sample showed moderate color travel with the illumination source perpendicular to the magnetic field, particularly a relatively fast transition from the achromatic center to the +a, −b quadrant. The second curve shows relatively low color travel, and relatively low chromaticity.

For 45-degree incidence, we can see violet (400 nm) and greenish (about 550 nm) hues at a viewing angle of 90 degrees. This corresponds to the first-order wavelengths. The minus-one order diffractive reflection is under the horizon (plane of the grating) for wavelengths longer than 550 nm at this grating frequency.

Figure 9D:
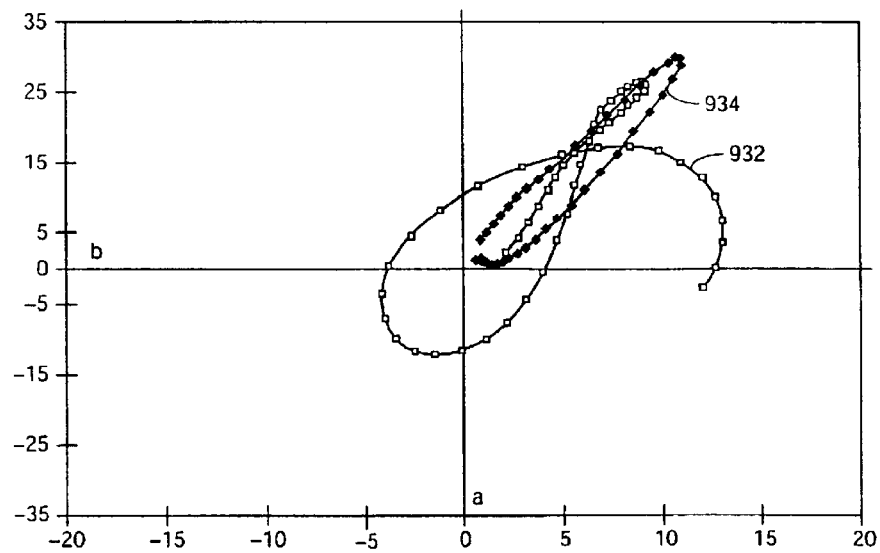

FIG. 9D is a simplified graph 930 of the color travel of magnetically aligned diffractive pigment flakes according to an embodiment of the present invention. Note the scale change. Magnetic diffractive flake was made substantially the same as the example illustrated in FIG. 9A with a grating of 1400 lines/mm embossed on the deposition substrate, but without the aluminum layers. The 50 nm layer of nickel served as the reflector. The overall appearance of the sample was less bright (more gray) than the similar sample made with aluminum reflective layers. The resultant flakes were similarly mixed in a carrier and spread on a card using a doctor's blade to draw down the flakes between two magnets that provided a magnetic field in the plane of the card to align the flakes.

The first curve 932 shows the color travel of the sample illuminated with an incident beam perpendicular to the aggregated diffraction gratings of the flakes. The second curve 934 shows the color travel of the sample illuminated with the incident beam parallel to the aggregated diffractions gratings.

Figure 9E:
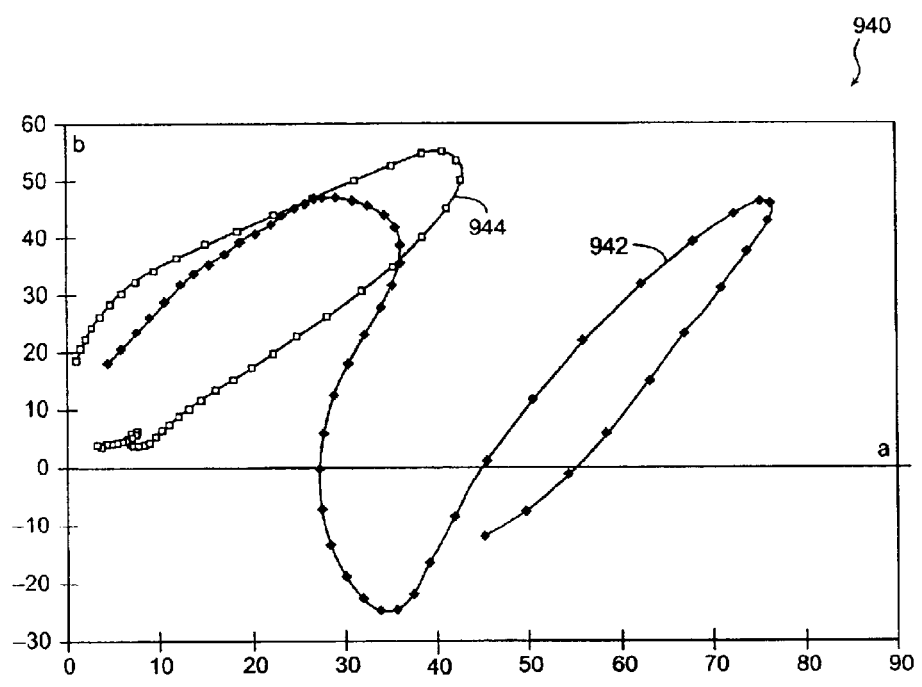

FIG. 9E is a simplified graph 940 of the color travel of a magnetically aligned diffractive pigment flakes according to an embodiment of the present invention. This design produced a gold-to-silver color change effect. Note that the scales are different from other figures. Magnetic diffractive flake was made with a grating of 1400 lines/mm embossed on the deposition substrate, but with a different optical design. The thin-film stack included semi-transparent layers of chromium (i.e. absorber layers) over the $MgF_2$ layers. In other words, the thin film structure was Cr—$MgF_2$—Al—Ni—Al—$MgF_2$—Cr. The $MgF_2$ layers provided stiffness and the spacer layer for the Fabry-Perot filter, although Fabry-Perot-type interference structures could be formed over the reflectors patterned with diffraction gratings. The resultant flakes were similarly mixed in a carrier and spread on a card using a doctor's blade to draw down the flakes between two magnets that provided a magnetic field in the plane of the card to align the flakes.

The first curve 942 shows the color travel of the sample illuminated with an incident beam perpendicular to the aggregated diffraction gratings of the flakes. The second curve 944 shows the color travel of the sample illuminated with the incident beam parallel to the aggregated diffractions gratings. The general impression of this sample is a gold field changing to silver upon tilting of the sample under illumination and presenting diffractive effects when illuminated with a highly oriented beam perpendicular to the oriented grooves (diffraction grating) of the flakes.

It is believed other effects may be achieved with other optical designs. For example, titanium nitride (TiN) might be used as a reflector material to impart a golden base color to a diffractive flake. Similarly, gold makes an excellent reflector for diffractive flake applications. Copper could be used to obtain yet other base colors and color shifts.

While the invention has been described above in terms of various specific embodiments, the invention may be embodied in other specific forms without departing from the spirit of the invention. Thus, the embodiments described above illustrate the invention, but are not restrictive of the invention, which is indicated by the following claims. All modifications and equivalents that come within the meaning and range of the claims are included within their scope.

What is claimed is:

1. A pigment particle comprising:
    a non-symmetrical selectively shaped magnetic structure capable of orienting the pigment particle with respect to an applied magnetic field; and
    a diffraction grating.

2. The pigment particle of claim 1 wherein the magnetic structure comprises shaped magnetic material.

3. The pigment particle of claim 1 wherein the magnetic structure comprises a semi-transparent magnetic material.

4. The pigment particle of claim 1 wherein the magnetic structure comprises nickel, cobalt, iron, gadolinium, terbium, dysprosium, erbium, Fe—Si alloy, Fe—Ni alloy, Fe—Co alloy, Fe—Ni—Mo alloy, $SmCo_5$, $NdCo_5$, $Sm_2Co_{17}$, $Nd_2Fe_{14}B$, $TbFe_2$, $Fe_3O_4$, $NiFe_2O_4$, or $CoFe_2O_4$.

5. The pigment particle of claim 1 wherein the diffraction grating comprises a plurality of grooves.

6. The pigment particle of claim 5 wherein the plurality of grooves has a spacing of between 500 lines per mm and 5000 lines per mm.

7. The pigment particle of claim 5 wherein the magnetic structure comprises magnetic needles disposed parallel to the plurality of grooves of the diffraction grating.

8. The pigment particle of claim 7 wherein at least some of the magnetic needles are joined with intervening magnetic material.

9. The pigment particle of claim 1 wherein the magnetic structure comprises a layer of magnetic material having variable thickness.

10. The pigment particle of claim 9 wherein the layer of magnetic material is a continuous layer.

11. The pigment particle of claim 1 disposed in an ink vehicle to provide an ink formulation.

12. The pigment particle of claim 1 dispersed in a paint vehicle to provide a paint formulation.

13. The pigment particle of claim 1 dispersed in a polymeric sheet, the diffraction grating of the pigment particle being selectively oriented in the sheet.

14. The pigment particle claim 1 wherein the diffraction grating includes a first plurality of grooves extending along a first direction and a second plurality of grooves extending along a second direction.

15. The pigment particle of claim 1 wherein the diffraction grating includes a fist plurality of grooves having a first linear grating spacing and a second plurality of grooves having a second linear grating spacing.

16. The pigment particle of claim 1 wherein the diffraction grating includes grooves aligned along the applied magnetic field when the pigment particle is oriented.

17. A pigment particle comprising:
    a magnetic structure capable of orienting the pigment particle with respect to an applied magnetic field; and
    a diffraction grating, wherein the magnetic structure is a layer of magnetic material and the pigment particle has a shape facilitating orientation in the applied magnetic field.

18. The pigment particle of claim 17 wherein the magnetic structure comprises shaped magnetic material.

19. The pigment particle of claim 17 wherein the magnetic structure comprises a plurality of magnetic stripes.

20. The pigment particle of claim 17 wherein the magnetic structure comprises a semi-transparent magnetic material.

21. The pigment particle of claim 17 wherein the magnetic structure comprises nickel, cobalt, iron, gadolinium, terbium, dysprosium, erbium, Fe—Si alloy, Fe—Ni alloy, Fe—Co alloy, Fe—Ni—Mo alloy, $SmCo_5$, $NdCo_5$, $Sm_2Co_{17}$, $Nd_2Fe_{14}B$, $TbFe_2$, $Fe_3O_4$, $NiFe_2O_4$, or $CoFe_2O_4$.

22. The pigment particle of claim 17 wherein the diffraction grating comprises a plurality of grooves.

23. The pigment particle of claim 22 wherein the plurality of grooves has a spacing of between 500 lines per mm 5000 lines per mm.

24. The pigment particle of claim 22 wherein the magnetic structure comprises magnetic needles disposed parallel to the plurality of grooves of the diffraction grating.

25. The pigment particle of claim 24 wherein at least some of the magnetic needles are joined with intervening magnetic material.

26. The pigment particle of claim 17 wherein the magnetic structure comprises a layer of magnetic material having variable thickness.

27. The pigment particle claim 26 wherein the layer of magnetic material is a continuous layer.

28. The pigment particle of claim 17 dispersed in an ink vehicle to provide an ink formulation.

29. The pigment particle of claim 17 dispersed in a paint vehicle to provide a paint formulation.

30. The pigment particle of claim 17 dispersed in a polymeric sheet, the diffraction grating of the pigment particle being selectively oriented in the sheet.

31. The pigment particle claim 17 wherein the diffraction grating includes a first plurality of grooves extending along a first direction and a second plurality of grooves extending along a second direction.

32. The pigment particle of claim 17 wherein the diffraction grating includes a first plurality of grooves having a first linear grating spacing and a second plurality of groves having a second linear grating spacing.

33. The pigment particle of claim 17 wherein the diffraction grating includes grooves aligned along the applied magnetic field when the pigment particle is oriented.

34. A pigment particle comprising:
    a magnetic structure capable of orienting the pigment particle with respect to an applied magnetic field; and
    a diffraction grating wherein the magnetic structure comprises a plurality of magnetic stripes.

35. A pigment particle comprising:
    a reflective layer patterned to include a diffraction grating; and
    a plurality of magnetic needles disposed along the diffraction grating.

* * * * *

UNITED STATES PATENT AND TRADEMARK OFFICE
CERTIFICATE OF CORRECTION

PATENT NO. : 6,902,807 B1  
DATED : June 7, 2005  
INVENTOR(S) : Argoitia et al.

It is certified that error appears in the above-identified patent and that said Letters Patent is hereby corrected as shown below:

Column 1,  
Line 36, "linegrams" should read -- kinegrams --.

Column 2,  
Line 54, "2B arc" should read -- 2B are --.

Column 3,  
Line 36, "are magnetic" should read -- are a few examples of magnetic --.

Column 4,  
Line 53, "intennetallic" should read -- intermetallic --.

Column 16,  
Line 47, "magnet wars" should read -- magnet was --.

Column 19,  
Line 50, "disposed in an" should read -- dispersed in an --.  
Line 62, "a fist plurality" should read -- a first plurality --.

Column 20,  
Line 50, "groves" should read -- grooves --.

Signed and Sealed this

Twenty-first Day of February, 2006

JON W. DUDAS  
*Director of the United States Patent and Trademark Office*